UNITED STATES PATENT OFFICE.

LEONARD ROBERTS COATES, OF BALTIMORE, MARYLAND.

MANUFACTURE OF FERTILIZER.

971,830.  Specification of Letters Patent.  Patented Oct. 4, 1910.

No Drawing.  Application filed August 26, 1909.  Serial No. 514,696.

*To all whom it may concern:*

Be it known that I, LEONARD ROBERTS COATES, of the city of Baltimore and State of Maryland, have invented certain Improvements in the Manufacture of Fertilizers, of which the following is a specification.

This invention relates to a novel method of treating a certain mineral discovered by me, whereby the same is rendered available for fertilizing purposes. The said mineral may be said to be a conglomerate of phosphate and carbonate of lime with a portion of the phosphate of lime chemically combined with said carbonate, and a portion generally consisting of phosphatic fossils, mechanically mixed with the carbonate of lime; and the object of the said invention is to disassociate certain of the said salts, and thus bringing them into a condition wherein they are adapted as agents in the promotion of plant life, as will hereinafter fully appear.

The said invention consists, first, in an improved process of treating the said mineral whereby the same is rendered an available plant food and that without respect to the proportions of its constituent parts; and secondly, in an extension of the first process whereby the said salts after being brought into the condition in which they are available as fertilizing materials, are mechanically mixed in predetermined proportions and so produce a fertilizer having a commercial value based on the percentages of phosphoric acid and lime contained therein.

In carrying out the first part of the process, I burn the mineral in order that the carbonate will be reduced to the oxid of lime. In practice I find that in the burning, a temperature of 800° to 1500° C. is necessary to decompose the mineral and liberate the carbonic acid. In general it may be said that the higher the phosphoric acid content, the more heat will be required. The requisite heat is much higher than the temperature necessary to decompose carbonate of lime and is probably due to the fact that some of the phosphate present is combined chemically with the carbonate. I then slake burned mineral by exposure to the air or otherwise, whereby the mass is broken up and the phosphate of lime before chemically combined with the carbonate of lime, liberated and thrown down in a substantially impalpable powder, and the fossils mechanically combined with the carbonate, brought to a friable condition without material change in shape and size. The material treated as described, will then consist of a mechanical mixture of hydrated lime, phosphate of lime in a finely divided state and phosphate of lime in coarse friable particles, and the said salts not being uniformly mixed, the substance is not reliable commercially, for general application to soils. I therefore pass the material through a screen of suitable mesh, and the coarser particles which are screened out and consisting largely of phosphate of lime, are ground and added to the portion that has passed through the screen, after which the whole is thoroughly mixed. The material will then consist of a mixture uniform throughout, of hydrated lime and phosphate of lime; and as the proportions of the elements of the crude material are not constant, but vary considerably, it will be understood that the substance produced as described, while valuable as a fertilizer, is not, for the reasons stated, in a condition to be sold as a commercial article having a fixed value. I therefore extend the process of manufacture in accordance with the second part of the invention as follows: After the mineral is burned, slaked and screened, the coarser particles ground, and the value of each of the separated bodies ascertained, the same are again united and in such proportions as are required to produce a compound having a predetermined value based upon the percentages of the lime and phosphoric acid contained therein.

I am of the opinion based upon practical tests that phosphate of lime when brought to an impalpable powder by burning and slaking a limestone containing it, is as available for plant food, as "phosphate rock" after the phosphorus in the same is rendered soluble by means of sulfuric acid; and I am not aware that heretofore, that is to say,—before my present invention, the mineral above referred to has been subjected to any process looking to its adaptation as a fertilizing agent.

I therefore claim as my invention,—

1. The process of producing from a mineral consisting of a conglomerate of carbonate of lime and phosphate of lime chemically combined, and the same mechanically mixed with carbonate of lime, and phosphatic fossils, two separate bodies adapted for fertilizing purposes, but differing in agricultural and commercial values, one body consisting of hydrate of lime mechanically mixed with a phosphate of lime, both salts being in the condition of a practically impalpable powder, and the other body, of phosphate of lime in fossil form and in a friable condition, which consists in burning and slaking the said material, and then separating the same into two bodies by screening out the said friable fossils of phosphate of lime, substantially as specified.

2. The process of treating a mineral composed of carbonate of lime and phosphate of lime which are in chemical combination, and the same mechanically mixed with phosphate of lime, whereby the two salts are disassociated and the latter reduced to practically an impalpable powder, and the whole brought to a body having the same constituent parts distributed throughout in uniform proportions, which consists in burning, and slaking the mineral, then screening out the coarser particles of phosphate of lime and grinding them, and then returning the ground to the unground constituent and mixing the two bodies together, substantially as, and for the purpose specified.

3. The process of treating a mineral composed of carbonate of lime and phosphate of lime which are in chemical combination and the same mechanically mixed with phosphate of lime, whereby the two salts are disassociated and the latter reduced to a practically impalpable powder, and a body thereby produced having the said constituent parts mechanically combined in predetermined proportions, which consists in burning and slaking the mineral, then screening out the coarser particles of phosphate of lime, and then mixing the ground and unground salts together in predetermined proportions whereby a fertilizer is produced having a commercial value based on the proportions of phosphoric acid and lime, contained therein, substantially as, and for the purpose specified.

LEONARD ROBERTS COATES.

Witnesses:
WM. T. HOWARD,
EDWARD P. HILL.